Patented Feb. 20, 1945

2,369,959

UNITED STATES PATENT OFFICE 2,369,959

PEST CONTROL

Albert L. Flenner, Wilmington, Del., and Frank H. Kaufert, St. Paul, Minn., assignors to E. I. du Pont de Nemours & Company, Wilmington, Del., a corporation of Delaware No Drawing. Application July 3, 1940,
Serial No. 343,820

3 Claims. (Cl. 167—30)

This invention relates to pest control and is particularly directed to methods and compositions for preventing, arresting or eradicating infestations of fungi, insects, bacteria, protozoa, molds and various other organisms economically harmful to man, which commonly infest organic matter whether of plant or animal origin, either in the natural, fabricated or synthetic state; which methods and compositions distinguish from the processes and compositions heretofore known in the use of chlorinated nitrotoluenes, especially those which are obtained by chlorinating a 2-nitrotoluene.

More particularly this invention relates to the control of noxious organisms which infest organic products such as lumber, wallboard, rope, fabric, fish net, paint, paper, leather, and like products which are subject to the attack of fungi, insects, bacteria and other harmful organisms, which control is effected by incorporating in the product a chlorinated nitrotoluene which preferably has a molecular weight greater than 200.

Among the more common industrial preservatives and disinfectants (as opposed to agricultural and medicinal) are the high molecular weight phenols such as the chlorinated phenols, the nitro phenols, the phenyl phenols and the naphthols; the metallic salts such as those of zinc, copper and mercury; the organic mercurials such as ethyl mercury hydroxide and its salts; and various arsenicals. These types of materials, depending upon their physical, chemical and physiological properties, find a wide variety of uses in industry as preservatives for wood, wallboard, rope, fabric, leather, fish net, paint, paper, and numerous other fabricated products to prevent or mitigate the attack of fungi, insects, bacteria and other harmful organisms to which the materials are characteristically susceptible. Any one of these materials, however, can be shown to have undesirable characteristics, whether because of low toxicity, high volatility, low oil-solubility, objectionable color or odor, high toxicity to man and any one of a number of undesirable characteristics.

We have now found that the chlorinated nitrotoluenes, especially those having a relatively high molecular weight, for instance in excess of 200, are particularly effective as the active agents in industrial preservatives and disinfectants and possess a particularly desirable combination of properties, including high toxicity to a wide variety of harmful organisms, low volatility, high oil-solubility, lack of color and odor, and low toxicity to man.

The chlorinated nitrotoluenes to which this invention is particularly directed are obtainable by the chlorination of 6-nitrotoluene, which when carried out according to methods well known in and practiced in the art yield both mono and polychlorinated derivatives. If monochlorination is practiced the product is a mixture of two isomers, namely, 6-nitro-2-chlorotoluene and 6-nitro-4-chlorotoluene, which may be utilized as such or separated by fractional crystallization or other methods known in the art. The 6-nitro-2-chlorotoluene may be chlorinated to give 6-nitro-trichlorotoluene. Likewise, the mixed 2-chloro and 4-chloro isomers may be chlorinated to yield the same product. Chlorination, however, does not necessarily yield a single product, but gives mono and poly chlorinated compounds some of which are probably isomeric. Compounds or mixtures thereof which are chlorinated sufficiently to have an equivalent molecular weight of at least 200 are preferred.

One industrial application in which the chlorinated nitrotoluenes are particularly suitable is in the preservation of millwork. Millwork is subject to attack by a wide variety of micro-organisms causing mold, decay and staining. Thus, micro-organisms such as fungus RS and *Lenzites trabea* cause rot and decay. Others such as Penicillium lumber molds, *Trichoderma lignorum* and *Aspergillus niger* cause blue or green mold; and others such as *Alternaria tenuis, Dematium pullulans, Ceratostomella pilifera* and *Diplodia pini* cause blue stain. The chlorinated nitrotoluenes are effective in controlling micro-organisms of these types and may be used for treating millwork in the following manner.

Example 1

Door casing, window sashes and moldings and like millwork may be effectively protected from mold, decay and staining by impregnating the finished work with a 5% solution of 6-nitro-trichlorotoluene (obtained by chlorinating 6-nitro-2-chlorotoluene) in mineral spirits having a flash point of about 102° F. These mineral spirits are commonly known as Stoddard solvents and are intermediate between kerosene and gasoline. The impregnation may be effected in any suitable manner as soaking in open tanks, dipping, spraying, painting or under vacuum or under pressure, or alternately under vacuum and pressure, according to the character of the wood being treated. Following the impregnation the wood is dried at a temperature below 30° C. with or without solvent recovery.

As illustrative of the effectiveness of this treatment, cross section samples of ponderosa pine (⅜ by 1 inch in cross section) which were impregnated with oil solutions of these compounds were completely effective against the organisms mentioned. Similarly treated samples which were leached for seven days after treatment were also effective against these organisms. Samples which were impregnated as described but with 2.5% solutions also were completely protected in both the leached and unleached condition. Similarly treated samples which were heated for 48 hours at 70° C., a condition which is some times encountered when millwork is exposed to the direct rays of the sun, were completely protected against mold and stain and were protected satisfactorily, though not completely, against decay when impregnated from 5% solution. When impregnated from 2.5% solutions about 75% control was obtained for each of the three types of organisms. Under the same conditions the controls (untreated samples) were badly attacked in all cases.

*Example 2*

In place of the impregnating solutions described in Example 1 the following may be substituted.

| Ingredient | 5% solution | 2.5% solution |
| --- | --- | --- |
| | Per cent | Per cent |
| 6-nitro-trichlorotoluene | 4.9 | 2.45 |
| Phenyl mercury oleate | 0.1 | 0.05 |
| Paraffin oil (110 sec. Saybolt) | 0.1 | 0.05 |
| Mineral spirits (102° F. flash point) | Balance | Balance |

Test samples impregnated as in Example 1 were completely protected against decay, mold, and stain in either the leached or unleached condition when impregnated with the 5% solution. Samples which were heated for 48 hours at 70° C. were completely protected against decay, mold and stain when impregnated from 5% solutions. Those samples similarly treated with 2.5% solution were completely protected against mold and stain and satisfactorily protected against decay. The controls under all the conditions were badly attacked.

In place of the 6-nitro-trichlorotoluene in Examples 1 and 2 we may use the polychlorinated product obtained by the chlorination of the mixed 2-chloro and 4-chloro isomers. The product thus obtained is essentially the same in effectiveness as that obtained by the chlorination of 6-nitro-2-chlorotoluene, but of course the degree of chlorination may vary. We prefer that the products so obtained have an equivalent molecular weight of at least 200. It is also preferred that the chlorination be not too drastic, since drastic chlorination is likely to introduce chlorine into the methyl group of the toluene nucleus. The aliphatic chlorine substituents are undesirable and have an irritant action. Unless otherwise qualified the term "toluene" as in 6-nitro-trichlorotoluene is not intended to include compounds in which substituents are present in the methyl group. Other chorinated nitro-toluenes may be employed, such as those obtained by the chlorination of mixed nitrotoluenes. The mono-nitro derivatives are preferred because of their high oil solubility.

In place of the mineral spirits we may use other volatile solvents such as fuel oil, kerosene, acetone, alcohol, dimethyl ether, etc. The impregnating compositions also may include other materials adapted to improve the character of the millwork. Thus they may include the drying or semi-drying oils with or without a drier, such as tung oil, perilla, oiticica, soya bean and dehydrated castor oil. They also may include waxes, rosins, rosin esters such as diethylene glycol ester and copal ester, or other materials suitable for use in conjunction with millwork.

Another industrial application in which the chlorinated nitrotoluenes are suitable is the preservation of lumber and timbers. Treatment in this case may be as described for millwork if applied to seasoned lumber, but preferably, particularly in the case of green lumber, is carried out under the pressure processes commonly used in the preservation of wood, for example, the Rueping process. The oil soluble character of the chlorinated mono-nitrotoluenes make them particularly suited for use in the petroleum oil treatments. They may be used, however, in conjunction with water-soluble preservatives such as zinc chloride if a solution in oil or a volatile solvent is suitably emulsified.

Another industrial application to which the chlorinated nitrotoluenes are particularly adapted is in the preservation of fabric. Tents, awning, sail cloth, shoe linings, sacks whether burlap or canvas, and like fabrics are subject to attack by organisms causing rot and decay of the character mentioned in connection with millwork. These materials can be impregnated by means of volatile solvents of the character described in Example 1, or the chlorinated nitrotoluenes may be incorporated in sizing or proofing materials used in the manufacture of such fabrics. Test samples of six-ounce duck fabric completely saturated with 2 and 4% solutions of 6-nitrotrichlorotoluene in mineral spirits were completely protected against rot and mold under the same conditions in which untreated controls were severely damaged by mold and rot. Complete control was also obtained in test samples impregnated with a solution containing 1% 6-nitro-trichlorotoluene, 0.1% phenyl mercury oleate, 0.1% paraffin oil of viscosity 100 sec. Saybolt, and the balance mineral spirits having a flash point of about 102° F.

While the impregnation may suitably be effected with volatile solvents of the character described in Example 1, it may also suitably be effected in other ways. Thus the chlorinated nitrotoluenes may be included in water proofing agents which are used to impregnate the fabric. Also, if fire retardants are used which are usually applied from aqueous solutions, the chlorinated nitrotoluene may be incorporated in such treating solutions as an emulsion or dispersion. The impregnation also may be effected directly from aqueous emulsions or dispersions independently of other proofing processes.

Another industrial application to which the chlorinated nitrotoluenes are particularly adapted is in the preservation of rope. Rope is particularly susceptible to attack by various bacteria and fungi which cause decomposition and decay. Repeated contact with soil which harbors a multitude of such organisms, and repeated exposure to moist conditions which are conducive to the growth and development of such organisms makes it particularly desirable that the rope be resistant to such attack. The preservative may be incorporated in the rope by impregnation as described in Example 1, using a volatile solvent; but, preferably, it is added to the oil used to lubricate the rope. In the manufacture of rope it is common practice to impregnate the rope with a heavy lubricating oil in amounts up to as much as 15% of the dry weight of the fibers. The chlorinated nitrotoluenes are easily soluble in such oils in the concentrations necessary to effect preservation of the rope. In tests conducted on ¼ inch manila and sisal rope, samples impregnated with 1.25% 6-nitro-trichlorotoluene based on the dry weight of the rope were completely protected against attack under conditions in which the breaking strength of untreated controls was reduced from more than 450 pounds to less than 50 pounds. These conditions were obtained by covering samples of treated and untreated rope with rich loam containing plenty of rotting vegetable matter and thus a wide range of destructive micro-organisms, and keeping the samples thus covered warm and moist in a greenhouse for three months. Complete protection was also obtained in samples impregnated with 0.25% phenyl mercury oleate and 0.6% 6-nitro-trichlorotoluene.

Still another industrial application to which the chlorinated nitrotoluenes are particularly adapted is in the preservation of paint. Paints containing insufficient zinc oxide, usually less than about 40%, are subject to discoloration by micro-organisms. Usually it is the oils used in the paint which are the point of attack. Linseed oil, for example, contains mucin, which is subject to attack by fungi causing mold. The chlorinated mono-nitrotoluenes being of high oil solubility are easily incorporated in the paint where, being in solution in the oils, they offer maximum protection without deleteriously affecting the paint films.

The chlorinated nitrotoluenes are also well suited for application to wallboard, paper and like felted products. They may be incorporated in such products by impregnating the finished product with impregnating solutions of the character already described. But most suitably they are incorporated in the felting process by dispersing them in the fiber slurries prior to felting. For paper and wallboard 6-nitro-trichlorotoluene can be milled with an inert powder such as talc, China clay, and the like and dispersed in the white water, in accordance with the practices usually followed in incorporating finely divided solids in paper and wallboard. Alternately the chlorinated nitrotoluene may be incorporated in the sizing compositions, or dispersed in the white water along with the size emulsions so as to be fixed in the fibers of the felted product when the size emulsion is broken.

Leather is another material which may be effectively treated by means of the chlorinated nitrotoluenes. Whether to protect the leather itself or finishes applied to the leather, or to prevent growth of mold and development of other organisms in organic matter accumulating in the pores of the leather as a result of use, the most suitable method of application is to incorporate the chlorinated nitrotoluene in the oils or fat used in processing and finishing the leather. For example, the chlorinated nitrotoluenes may be incorporated in the oil phase of fat liquors in the stuffing oils or fats or in the finishing oils.

The chlorinated nitrotoluenes, as more particularly set forth in the application of Frank H. Kaufert, Serial No. 343,775, filed of even date herewith (now Patent Number 2,343,415 dated March 7, 1944), have been found highly toxic to termites. They are of particular advantage consequently in preservation of lumber and treatment of wallboard in that they not only preserve these products against decay but also prevent infestation by termites.

A preferred embodiment of my invention is illustrated by the compositions previously set forth which contain both 6-nitro-trichlorotoluene and phenyl mercury oleate. With these compositions we are able to obtain a degree of control in many instances which cannot be obtained with either constituent alone. The paraffin oil in the representative compositions given may be omitted but phenyl mercury oleate is more easily obtained free of impurities if it is prepared as a concentrated solution in a heavy mineral oil. Other oil soluble phenyl mercury compounds may of course be substituted for phenyl mercury oleate.

Thus the products of my invention may be applied to the control of a wide variety of pestiferous organisms by incorporation in a material to be preserved. They may be applied in solution in organic solvents or in aqueous dispersions. They may be used alone or in combination with supplementary agents such as talc, bentonite, clays, spreaders, stickers and other adjuvants common in the pest control art. They may also be used in combination with other fungicides and insecticides whenever it is desired to reduce specificity and to effect simultaneous control of different kinds of pests.

We claim:

1. An industrial preservative and disinfectant composition containing as an essential active ingredient 6-nitro-trichlorotoluene and a carrier therefor.

2. The method of preserving organic products from attack by pestiferous organisms which comprises incorporating in the product 6-nitro-trichlorotoluene.

3. The method of preserving porous cellulosic products from attack by pestiferous organisms which comprises incorporating in the pores of said product 6-nitrotrichlorotoluene.

ALBERT L. FLENNER.
FRANK H. KAUFERT.